July 2, 1929.                K. I. FINNEY                1,719,604
                FINGER BOARD FOR MUSICAL INSTRUMENTS
                        Filed March 1, 1926
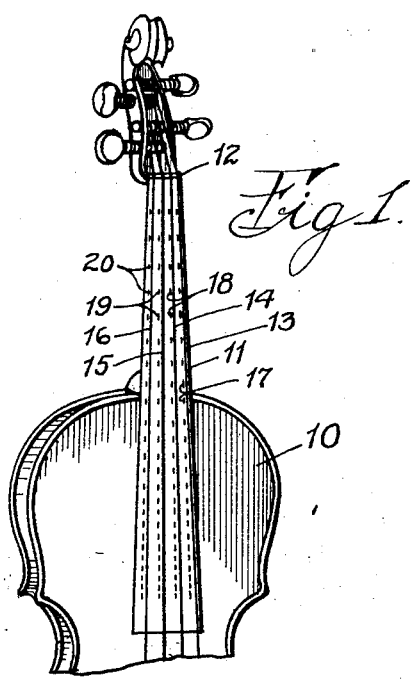
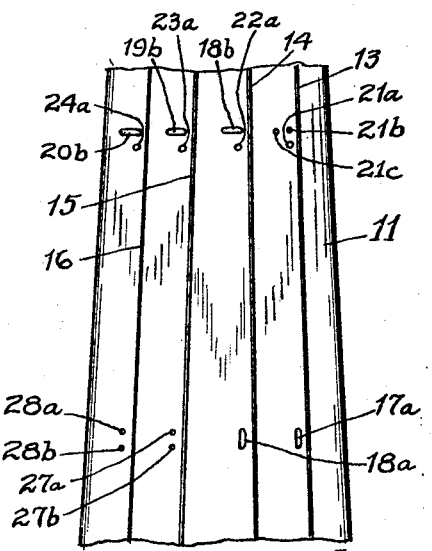
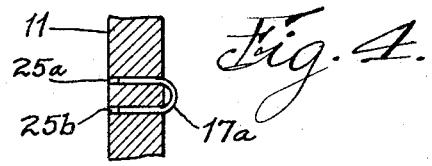
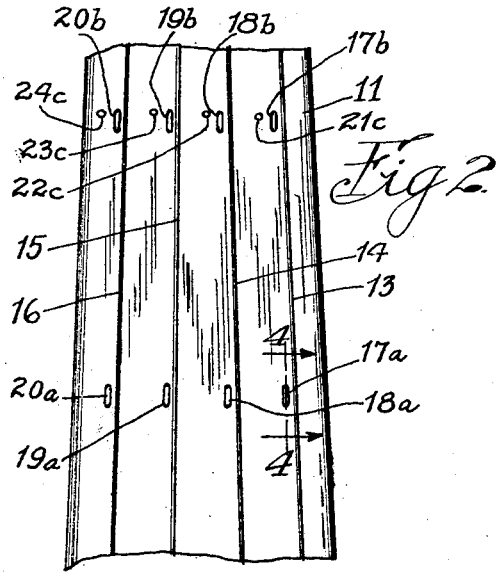
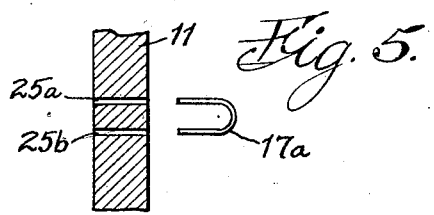
INVENTOR
KNUTE I. FINNEY.
BY Albert C. Bell
ATTORNEY.

Patented July 2, 1929.

1,719,604

UNITED STATES PATENT OFFICE.

KNUTE I. FINNEY, OF CHICAGO, ILLINOIS.

FINGER BOARD FOR MUSICAL INSTRUMENTS.

Application filed March 1, 1926. Serial No. 91,406.

My invention relates to an improved construction and system to facilitate learning to play stringed instruments of the type where the finger board of the instrument does not carry stops or frets as a guide to the performer in placing his fingers on the strings to secure tones other than the open tones of the strings, for example violins, violas, violoncellos, etc.

It is well known that in learning to play a stringed instrument of the class referred to, one of the most difficult things is for the student to train his fingers to naturally and mechanically take the correct positions on the finger board required to stop the strings at just the right points to produce desired tones by means of the strings, and that very long practice and much patient effort is required to accomplish this, where no mechanical aid is employed. I have found that it is very helpful and beneficial to the student to have a mechanical aid in so locating his fingers, that it invariably is a means of locating the fingers in correct position, and as a result the student becomes trained mentally and the fingers become trained mechanically in much shorter time than where the training must be had with nothing but the plain finger board and the ear to guide him in properly locating his fingers. I am aware that various means have been proposed heretofore to serve as a mechanical aid for the purpose described. To be successful, such a mechanical means must afford a positive indication of finger position, it must be available for use for every tone of the diatonic scale, and must not be of such a nature as to interfere in any way with the fingering of the strings; moreover it is desirable with such an aid that the devices employed to guide the fingers to proper position be susceptible of arrangement according to the requirements at any particular time, that is to say, if the student is studying a particular major or minor scale, it is helpful to have the finger stops or guides arranged at that time to correspond with the intervals of that particular scale, without however, interfering with the rearranging of the stops or guides to the intervals of some other desired scale.

In my Patent No. 967,507 which issued to me August 16, 1910, I show a means for accomplishing the results indicated above, which has been largely successful in attaining the desired ends. In my prior patent referred to, however, the finger guides or stops are in the form of small pins frictionally held in corresponding holes in the finger board, these pins having heads projecting slightly above the surface of the finger board to give the performer the sense of position, these guides or stops being located just to one side of the strings, so that the strings may rest against the finger board when depressed, without having their action modified in any way by the stops. With the construction just described, I have found it difficult in all cases to secure just the degree of frictional engagement between the pins and the holes for receiving them, that is necessary to retain the pins in the finger board so that the heads of the pins will not raise slightly from the finger board during the use of the instrument, and yet at the same time permit the ready changing of the grouping of the pins to correspond to a desired musical scale. By my present invention I provide a different type of stop or guide, each being in the form of a loop, or having a U-shape, so that each stop has a slight spring action tending to retain it in any pair of holes in the finger board made to receive it, which will not interfere with the ready removal of the stop so that it may be placed in a different position if desired; furthermore, with these U-shaped stops, there is nothing in the nature of a sharp edge extending above the finger board and should the stop for any reason be slightly too high above the finger board, the first passage of the finger of the player over it, instead of catching on the stop presses it into the finger board where it belongs, leaving just the curved mid portion of the stop projecting above the surface of the finger board an amount substantially equal to the thickness of the material of the stop. The stops are preferably made from metal wire having more or less resilience, and the spring action of the metal is made use of to hold the stops frictionally in the corresponding holes made in the finger board to receive them. Another marked advantage of my present construction, is that while the holes for receiving the stops are made in lines parallel with the strings where the entire finger board is used, and thus each stop is caused to have a position parallel with the corresponding string, I am able to afford the player another kind of indication by drilling additional holes in the finger board in rows at right angles to the strings, so that the stops placed in these holes will extend crosswise of the strings and thus produce a markedly different effect on the fingers of the player from the stops placed in parallel relation to the strings. This feature I may make use of to advantage for the purpose of "position" playing, that is where the student is studying position work, the stops at the corresponding position may all be turned at right angles to the strings and thus give the student an indication differing from the indication of the tone intervals of the scales, as to where the reference position is for this particular "position" of playing. It will be understood of course that at any point where it is desirable to afford the student an indication for "position" playing, only three holes are required in the finger board for each stop, one being common for either position of the stop, another determining its position parallel with the corresponding string and the third, determining its position at right angles with the corresponding string. It will be understood that in referring to the location of the stops for "position" playing, while a right angle position of the stops is convenient, I do not limit myself to this particular relation of the stops to the strings, as any relation of them to the strings, differing sufficiently from their position substantially parallel with the strings, to afford a different indication to the player from that afforded by their relation parallel with the strings, will accomplish the intended purpose.

My invention will best be understood by reference to the accompanying drawings showing a preferred embodiment thereof in which Fig. 1 shows the finger board of a violin, illustrating the location of my improved stops, Fig. 2 shows in a view similar to Fig. 1 a portion of the finger board and strings to an enlarged scale, Fig. 3 shows in a view similar to Fig. 2 the same portions of the finger board and strings with the stops in different relation, Fig. 4 is a sectional view to an enlarged scale through a part of the finger board shown in Fig. 2 taken along the line 4—4, showing one of the stops in place in the finger board, and Fig. 5 is a view similar to Fig. 4 showing the stop removed from the holes receiving it in Fig. 4.

Similar numerals refer to similar parts throughout the several views.

As shown in Fig. 1 a part of a violin is indicated at 10 which is provided with a finger board 11 carrying at its upper end a nut 12 over which the strings 13, 14, 15 and 16 extend. The parts of the construction not shown in Fig. 1 are the same as commonly found in violin construction. Rows of stops 17, 18, 19 and 20 are carried by the finger board for the strings 13, 14, 15 and 16 respectively, each row of stops being parallel with the corresponding string and just sufficiently to one side of the string so that it may be depressed against the finger board in the regular manner without touching the stops. Provision is made in connection with each string that a stop may be used at each half tone, so that by suitably arranging the stops, the tone intervals represented by them may be made to correspond to any desired musical scale, whether major, minor or chromatic. In other words the provisions made for receiving the stops take care of all possible positions in the diatonic scale.

In Figs. 2 and 3 I show more clearly the relation of several of the stops to the strings, and in Fig. 2, at one position stops $17^a$, $18^a$, $19^a$ and $20^a$ are shown in parallel relation to the corresponding strings 13–16 inclusive, as they would be used assuming that a stop is required for each of the strings at this particular position and further, that for this particular position it is not desired to afford any indication to the player excepting the usual indication of half tone intervals, or intervals of the particular scale in which the playing is being done; in Fig. 2 I also show stops $17^b$, $18^b$, $19^b$ and $20^b$ respectively for the strings 13–16 inclusive in the position they occupy where they are required to indicate in the regular manner, positions in the scale in which the playing is being done, but in this case I indicate additional holes in the finger board at $21^c$, $22^c$, $23^c$ and $24^c$ for the stops $17^b$, $18^b$, $19^b$ and $20^b$ respectively, this being one of the positions assumed for which the stops are to afford a player a different kind of indication if desired, these holes being spaced relatively to the holes occupied by the stops so that the stops may be withdrawn from the relation indicated in Fig. 2 and some or all of them placed in a different position relatively to the strings, in the holes $21^c$, $22^c$, $23^c$ and $24^c$ as desired, each of the stops still being contained in one of the holes provided to hold it in substantially parallel relation with the corresponding string when the different indication to the player is not desired. In Fig. 3, the stops $18^b$, $19^b$, $20^b$ are shown in their different relation to the strings, from the relation indicated in Fig. 2, this different relation being at substantially right angles to the strings, in which case the holes $22^a$, $23^a$ and $24^a$ for these stops respectively are not employed. In this figure the stop $17^b$ is not shown, to facilitate illustrating the holes $21^a$, $21^b$ and $21^c$ made in the finger board to receive it, the holes $21^a$ and $21^b$ receiving said stop in a position parallel with the string 13, or substantially so, while the holes $21^b$ and $21^c$ receive said stop in a position at right angles to the string 13, or substantially so. In Fig. 3 the stops 19ª and 20ª are not shown to illustrate the manner of forming the holes in finger board 11 where a single indication is desired, the holes 27ª and 27ᵇ being for the reception of the stop 19ª and the holes 28ª and 28ᵇ being for the reception of the stop 20ª when it is desired to use said stops, these holes providing only for the substantially parallel relation of these stops to the corresponding strings.

In Fig. 4 I illustrate the stop 17ª in place in the corresponding holes 25ª and 25ᵇ formed for it in the finger board 11, the stop being held in substantially the position indicated by the resilience of the material of which the stop is formed. As indicated in this figure the stop is U-shaped and it is made preferably from metal wire having sufficient resilience to grip the holes containing its ends with sufficient pressure to prevent the stop falling from the finger board or being accidentally removed therefrom, without however, preventing the ready removal of the stop when it is desired to remove it from the finger board. In Fig. 5 I show the stop 17ª removed from the finger board. Any desired material may be employed in making the stops, and I find it advantageous to make them from material of pleasing appearance, that will not readily tarnish and to that end they may be desirably made of gold wire or gold plated wire. For some purposes it is desirable to use the full equipment of stops provided for by the finger board, that is to say one stop for each half tone on each string, and to distinguish between the stops that are involved in any desired scale and the remaining stops, in which case certain of the stops may conveniently be plated in one manner, or lacquered in one color and the remaining stops have a distinctive color of plating or lacquer, or again stops of distinctive color or appearance may be employed to indicate the notes not forming a part of the particular scale being used, and stops of uniform appearance may be employed to indicate the regular tone intervals of a desired scale, and in fact the stops of different appearance may be employed in any combination found advantageous for indicating any particular locations, either regular to a particular scale or irregular or special as desired.

While I have shown my invention in the particular embodiment above described, it will be understood that I do not limit myself to this exact construction as I may employ equivalents known to the art at the time of the filing of this application without departing from the scope of the appended claims.

What I claim is:

1. A finger guide for stringed musical instruments, comprising the combination of a finger board having holes therein in pairs at the intervals of the diatonic scale for each string, and bent wire stops each having substantially parallel legs and each having its legs in a desired pair of said holes to afford indications of desired tone intervals to a player, said stops being of spring wire pressing by spring action against the sides of the holes containing them.

2. A finger guide for stringed musical instruments, comprising the combination of a finger board having holes therein at the intervals of the diatonic scale for each string, and U-shaped stops having their legs in desired ones of said holes to afford indications of desired tone intervals to a player, there being three of said holes per stop at desired points affording different playing indications at the same finger positions.

3. A finger guide for stringed musical instruments, comprising the combination of a finger board having holes therein at the intervals of the diatonic scale for each string, and stops in said holes to afford indications of desired tone intervals to a player, certain of said stops having each different angular relations to the strings affording different playing indications at the same position and said holes coacting to hold each of said certain stops in a selected one of said angular relations.

4. A finger guide for stringed musical instruments, comprising the combination of a finger board having holes therein in pairs at the intervals of the diatonic scale for each string, and bent wire stops each having substantially parallel legs and each having its legs in a desired pair of said holes to afford indications of desired tone intervals to a player, said stops in place being free from laterally projecting portions.

5. A finger guide for stringed musical instruments, comprising the combination of a finger board having holes therein at the intervals of the diatonic scale for each string, and U-shaped stops having their legs in desired ones of said holes to afford indications of desired tone intervals to a player, there being three of said holes per stop at desired points affording different playing indications at the same finger positions said stops in place being free from laterally projecting portions.

In witness whereof, I hereunto subscribe my name this 25th day of February, A. D. 1926.

KNUTE I. FINNEY.